United States Patent [19]
Tung et al.

[11] Patent Number: 5,013,790
[45] Date of Patent: May 7, 1991

[54] POLYMER BLENDS OF TAPERED STYRENE-BUTADIENE TRIBLOCK THERMOPLASTIC ELASTOMERS

[75] Inventors: Lu H. Tung, Midland; Joseph J. Randazzo, Berkley, both of Mich.

[73] Assignee: The Dow Chemical Company, Midland, Mich.

[21] Appl. No.: 375,552

[22] Filed: Jul. 5, 1989

[51] Int. Cl.$^5$ .................... C08L 21/00; C08L 25/06; C08L 35/06; C08L 53/02
[52] U.S. Cl. ........................ 525/99; 525/71; 525/95; 525/98
[58] Field of Search .................. 525/89, 95, 71, 98, 525/99

[56] References Cited

U.S. PATENT DOCUMENTS

| | | |
|---|---|---|
| 3,906,057 | 9/1975 | Durst . |
| 3,906,058 | 9/1975 | Durst . |
| 4,195,136 | 3/1980 | Sato et al. ............................ 525/89 |
| 4,196,154 | 4/1980 | Tung . |
| 4,267,283 | 5/1981 | Whitehead ............................ 525/89 |
| 4,680,357 | 7/1987 | Biletch et al. ....................... 525/310 |

OTHER PUBLICATIONS

Abstract of Japanese Patent 56-62847, Sesume Oooka et al., 5/81.
K. van Henten, Plastica, (1972)25,4,144.
R. R. Durst et al., Toughness and Brittleness of Plastics, "Super High Impact Polystyrene", Advances in Chemistry Series, 154, ACS (1976).

Primary Examiner—Allan M. Lieberman
Attorney, Agent, or Firm—Douglas N. Deline

[57] ABSTRACT

A thermoplastic blend useful for the preparation of molded articles comprising a thermoplastic polymer and a tapered triblock elastomer of a monovinylidene aromatic monomer and butadiene having a melt index (condition 200/5.0 ASTM method D1238-82) of 0.5 to 60 and an average molecular weight from 50,000 to 135,000.

7 Claims, No Drawings

POLYMER BLENDS OF TAPERED STYRENE-BUTADIENE TRIBLOCK THERMOPLASTIC ELASTOMERS

BACKGROUND OF THE INVENTION

The present invention relates to a blend of a tapered styrene-butadiene triblock thermoplastic elastomer with a rigid thermoplastic polymer. More particularly the present invention relates to such a blend utilizing low molecular weight tapered triblock elastomers having improved mechanical properties and ease of preparation.

It is previously known in the art to prepare blends of thermoplastic elastomers and in particular tapered styrene-butadiene block copolymer elastomers. In U.S. Pat. Nos. 3,906,057 and 3,906,058 there are disclosed blends of polystyrene or impact modified polystyrene polymers with tapered styrene-butadiene triblock elastomers. However, the triblock elastomers had high molecular weights in excess of 150,000 and preferably between 200,000 and 500,000. Such high molecular weight triblock elastomers are difficult to incorporate into thermoplastic resins due to the fact that the same have extremely low or even zero melt flow rates. Precise blending conditions had to be observed (see U.S. Pat. No. 3,906,507, Col. 6, lines 25–35) to achieve the desired effect. The use of such high molecular weight triblock elastomers under more normal blending conditions requires addition of an extender oil such as a naphthalenic or paraffinic oil to produce a block copolymer composition which is flowable and easily incorporated into the thermoplastic polymer. Disadvantageously such extender oils detrimentally affect the physical properties of the resulting thermoplastic blend.

SUMMARY OF THE INVENTION

According to the present invention there is provided a thermoplastic blend comprising:

(1) a thermoplastic polymer: and
(2) a tapered triblock elastomer of the formula A-B-A wherein B is a polymer of butadiene and each A block is a polymer of a monovinylidene aromatic monomer and at least one junction between the A and B blocks is tapered so as to include in copolymerized form increasing amounts of butadiene toward the B block, said tapered triblock elastomer having a ratio of monovinylidene aromatic monomer:butadiene of from 10:90 to 60:40: a melt index (condition 200/5.0 ASTM method D1238-82) of 0.5 to 60; and an average molecular weight (Mw) of 50,000–150,000.

DETAILED DESCRIPTION OF THE INVENTION

Thermoplastic resins which may be advantageously modified by incorporation of the tapered triblock elastomers according to the present invention are those resins previously known in the art as suitably modified by the addition of rubbery elastomers. Examples include polystyrene, high impact polystyrene (i.e., styrene polymerized in the presence of a rubbery dissolved elastomer particularly polybutadiene), copolymers of styrene and one or more copolymerizable comonomers and rubber modified derivatives thereof, polyvinylchloride, polyphenylene ethers, polycarbonates, polyacetals, polyolefins such as polyethylene, polypropylene, etc. and blends of the foregoing resins. Preferred thermoplastic polymers for use according to the present invention include polystyrene, styreneacrylonitrile copolymers, and rubber modified derivatives thereof.

The tapered triblock elastomers for use according to the present invention may be prepared according to well known techniques. Suitable methods of preparation are previously disclosed in the aforementioned U.S. Pat. Nos. 3,906,057 and 3,906,058 the teachings of which are incorporated herein in their entirety by reference thereto. A preferred method of preparation of the tapered triblock elastomers is by the use of a soluble difunctional anionic initiator such as 1,3-phenylene-bis(3-methyl-1-phenylpentylidene)-bis-(lithium) in toluene solution. Such difunctional organolithium initiator is prepared as described in U.S. Pat. No. 4,196,154 the teachings of which are incorporated herein in their entirety by reference thereto.

Preferred block copolymers are triblock elastomers having two monovinylidene aromatic monomer tapered blocks incorporating progressively a total of about 10 percent by weight of butadiene therein. Highly, preferably such tapered triblock elastomers are styrene-butadiene triblock polymers having a ratio of styrene to butadiene from 30:70 to 40:60 and an average molecular weight of greater than 55,000 and less than 120,000. Most preferably, they have an average molecular weight of from 60,000 to 110,000.

In addition to the thermoplastic polymer and tapered triblock elastomer additional ingredients may be included in the thermoplastic blends according to the present invention. Suitable additional additives include pigments, fiber reinforcement aids (such as glass roving, carbon fibers, etc.), extrusion aids, antioxidants, fillers, fire retardants etc. The blend may be prepared by melt blending in a suitable mixer the respective ingredients until thorough incorporation is obtained.

Thermoplastic blends according to the present invention are easily prepared without the use of a extender oil or other suitable liquid ingredient to obtain thorough dispersion of the tapered triblock elastomer. The resulting blends moreover demonstrate improved impact resistance as indicated by increased Izod impact and Gardner impact values. The resulting thermoplastic blend is suitably employed in the preparation of molded objects for use as components in automobiles, machinery and toys.

Having described the invention the following examples are provided as further illustrative and are not to be construed as limiting. Unless stated otherwise all percentages and portions are measured in percentages and parts by weight.

EXAMPLE 1

To a nitrogen purged 2 liter air-tight stirred reactor, 1350 mL purified cyclohexane was added. To the same vessel, 143 g of purified 1,3-butadiene and 70.5 g of purified styrene were added. The reaction mixture in the reactor was then heated to 50° C. Next 0.13 millimoles pentamethyl diethylene triamine (provides narrow molecular weight product) and a difunctional organolithium initiator of 2.6 millimoles 1,3-phenylenebis(3-methyl-1-phenylpentylidene)-bis-(lithium) in toluene were added to initiate the polymerization. The temperature of the reaction mixture rose to about 80° C. in about 25 minutes after initiation. Shortly thereafter the faintly yellow solution turned to an intense red color indicating that styrene polymerization had started. A second rise of temperature was observed.

Afterwards the temperature started to subside. The polymerization was allowed to proceed for 30 minutes after the color change and then was terminated by the addition of isopropyl alcohol. The recovered block copolymer was a tapered styrene-butadiene-styrene (SBS) triblock polymer. The weight average molecular weight determined by GPC was 96,600. Based on the feed weights the polymer contained 67 percent butadiene and 33 percent styrene. It had a melt index of 5.6 (condition 200/5.0 ASTM method D1238-82). The tapered block copolymer is easily incorporated into polystyrene homopolymer (Mw 150,000) by melt blending. The resulting resin blend is used to prepared moldings having good impact resistance.

EXAMPLE 2-COMPARISON OF POLYMER BLENDS

Two more tapered SBS block copolymers of different molecular weights were prepared in a 5 gallon reactor using essentially the same recipe as that in Example 1. Tapered triblock A had a melt index of 2.0 (Mw 103,000). Tapered triblock B had a melt index of 5.0 (Mw 97,000). Two untapered SBS block copolymers were prepared substantially according to the polymerization method described in U.S. Pat. No. 3,465,065. Untapered triblock C had a melt index of 2.9 and D a melt index of 5.0. All four triblock copolymers were recovered from their polymerization solvents, extruded and cut into pellets. A commercially available untapered SBS block copolymers (Kraton ® 1102) available from Shell Chemical Co. having a melt index of 6.0 in pellet form (E) was also used in the comparison.

The various triblock elastomers (5 weight percent) were dry blended with a rubber modified high impact polystyrene (77.35 weight percent) and ignition resistant additives (14.9 weight percent) and melt extruded and injection molded to provide test bars for property testing. Results are contained in Table I.

TABLE I

|  | A | B | C* | D* | E* |
|---|---|---|---|---|---|
| Tensile Yield (MPa) | 20.7 | 20.7 | 20.7 | 20.7 | 20.7 |
| Tensile Rupture (MPa) | 23.3 | 23.3 | 23.4 | 22.5 | 23.6 |
| Tensile Modulus (MPa) | 2140 | 2000 | 2200 | 2000 | 2000 |
| % Elongation | 53 | 48 | 48 | 49 | 50 |
| Impact Strength (Izod) (J/m) | 115 | 117 | 111 | 114 | 108 |
| Impact Strength | 92 | 102 | 50 | 54 | 45 |

TABLE I-continued

|  | A | B | C* | D* | E* |
|---|---|---|---|---|---|
| (Gardner) |  |  |  |  |  |
| Flexural Strength (MPa) | 48.1 | 48.1 | 47.7 | 47.2 | 48.4 |
| Flexural Modulus (MPa) | 2070 | 2070 | 2070 | 2070 | 2070 |

*Not an example of the invention.

As may be seen by reference to the above tabulated results, moldings prepared from the resins according to the present invention possess improved impact resistance, especially Gardner impact resistance, compared to resins prepared utilizing untapered block copolymers.

What is claimed is:

1. A thermoplastic blend comprising:
   (1) a thermoplastic polymer; and
   (2) a tapered triblock elastomer of the formula A-B-A wherein B is a polymer of butadiene and each A block is a polymer of a monovinylidene aromatic monomer and at least one junction between the A and B blocks is tapered so as to include in copolymerized form increasing amounts of butadiene toward B block, said tapered triblock elastomer having a ratio of monovinylidene aromatic monomer:butadiene of 10:90 to 40:60 a melt index (condition 200/5.0 ASTM method D1238-82) of 0.5 to 60; and an average molecular weight Mw of 50,000–150,000;
   the quantity of component (2) being sufficient to improve the impact resistance of the blend.

2. A thermoplastic blend according to claim 1 wherein the thermoplastic polymer is polystyrene, styrene acrylonitrile copolymer, or rubber modified derivatives thereof.

3. A thermoplastic blend according to claim 2 wherein the thermoplastic polymer is a high impact polystyrene.

4. A thermoplastic blend according to claim 1 additionally comprising an ignition resistant additive.

5. A thermoplastic blend according to claim 1 wherein the tapered triblock elastomer comprises styrene and butadiene 6. A thermoplastic blend according to claim 1 wherein the tapered triblock elastomer has an average molecular weight of from greater than 55,000 and less than 120,000.

7. A thermoplastic blend according to claim 1 comprising about 5 weight percent component (2).

* * * * *